United States Patent [19]
Ader

[11] Patent Number: 4,542,402
[45] Date of Patent: Sep. 17, 1985

[54] DIGITAL COLOR MATRIX FOR A DIGITAL TELEVISION RECEIVER

[75] Inventor: Joseph R. Ader, Yardley, Pa.

[73] Assignee: RCA Corporation, Princeton, N.J.

[21] Appl. No.: 502,002

[22] Filed: Jun. 7, 1983

[51] Int. Cl.[4] .......................................... H04N 9/539
[52] U.S. Cl. ...................................................... 358/30
[58] Field of Search .................................... 358/30, 13

[56] References Cited

U.S. PATENT DOCUMENTS 4,303,912 12/1981 Stafford et al. ....................... 358/13
4,355,327 10/1982 Nagumo et al. ...................... 358/13
4,503,454 3/1985 Lewis, Jr. .............................. 358/30

Primary Examiner—Richard Murray
Attorney, Agent, or Firm—Eugene M. Whitacre; Paul J. Rasmussen; Joseph J. Laks

[57] ABSTRACT

In a digital television receiver, a digital signal processing system generates samples of binary coded color mixture digital signals that are a representation of color picture information. The values of binary coded coefficients that convert the representation of the color picture information into binary coded color difference signals are stored in a memory accessed by a microprocessor. In response to adjustment of controls such as contrast and tint, the microprocessor modifies the coefficients. The modified coefficients are placed in a digital store such as a latch arrangement. A multiplier arrangement receives samples of the color mixture digital signals as first inputs for multiplying them by corresponding modified coefficients that are supplied by the digital store as second inputs. A clock signal is generated that sequentially clocks out of the digital store selected ones of the modified coefficients for developing a sequence of products corresponding to the color mixture components of the color difference signal. The products are then combined to form samples of the binary coded color difference signal.

8 Claims, 3 Drawing Figures

DIGITAL COLOR MATRIX FOR A DIGITAL TELEVISION RECEIVER

This invention relates to a digital color matrix for a digital signal processing system in a television receiver.

In digital television receivers, an analog baseband video signal is sampled and the samples converted to representative digital samples by an analog-to-digital converter. The digital samples are processed in a digital comb filter to produce digital signals representing separated luminance and chrominance information. The digital luminance and chrominance information containing signals are then processed in respective channels of a digital signal processor to produce digital color mixture signals such as I and Q signals and digital luminance or Y signals. A digital matrix may be used to combine the I, Q and Y signals to produce R, G and B primary color digital samples. The digital samples are then applied to respective R, G and B drive voltages for driving the cathodes of a color picture tube.

To develop the R, G and B digital samples, the color difference signals R-Y, G-Y and B-Y digital color difference signals are generated from the I and Q color mixture signals. The Y luminance signal is then added to each of the three color difference signals to develop the three primary color digital samples.

The three color difference signals are related to the two color mixture signals by a set of coefficients $a_i$, $b_i$, $i=1, 2, 3$, in accordance with the following equations:

$$R\text{-}Y = a_1 I + b_1 Q$$

$$G\text{-}Y = a_2 I + b_2 Q$$

$$B\text{-}Y = a_3 I + b_3 Q$$

where $a_i$, $b_i$ have well-known, established values.

In the U.S. patent application of H. G. Lewis, Jr., Ser. No. 444,521, now U.S. Pat. No. 4,503,454 filed Nov. 26, 1982, entitled COLOR TELEVISION RECEIVER WITH A DIGITAL PROCESSING SYSTEM THAT DEVELOPS DIGITAL DRIVER SIGNALS FOR A PICTURE TUBE, the products of the I and Q samples multiplied by the appropriate coefficients $a_i$, $b_i$ are obtained by using a read-only memory, ROM, constructed as a look-up table multiplier. The I and Q digital samples address locations within the ROM in which locations are stored the product information. If the values of the coefficients $a_i$, $b_i$ are not fixed but are dynamically varied then a random access memory, RAM, or a programmable read-only memory may be used. Use of these devices represents a relatively expensive solution to enable the I and Q samples to be multiplied by variably valued coefficients.

A feature of the invention is a digital matrix to obtain color difference signals from color mixture signals that does not use ROM multipliers. A digital signal processing system generates samples of binary coded color mixture signals that are a representation of color picture information. A microprocessor or other digital hardware generates values of binary coded coefficients that convert the representation of the color picture information from color mixture signals into binary coded color difference signals. A multiplier arrangement receives samples of the binary coded color mixture signals as first inputs for multiplying samples thereof by corresponding binary coded coefficients that are supplied as second inputs. A digital store receives the binary coded coefficients. The outputs of the digital store are supplied as second inputs of the multiplier arrangement. A clock generator generates a selection clock signal that sequentially clocks out of the digital store selected ones of the stored binary coded coefficients for enabling the multiplier arrangement to develop a sequence of products corresponding to the color mixture components of the binary coded color difference signals. The products so formed are combined, by an adder, for example, to form samples of the binary coded color difference signals.

An advantageous aspect of the above recited digital matrix, in addition to the ability to multiply I and Q samples by variable coefficients, is that conventional adder tree or array multipliers may be used in the multiplying arrangement. Because adder array multipliers may require for its fabrication the dedication of a relatively large area on an integrated circuit chip, the sequential clocking out of coefficients to the multiplier, enables only one or two multipliers to develop the six products that form the components of the three color difference signals R-Y, G-Y and B-Y.

Figure 1:
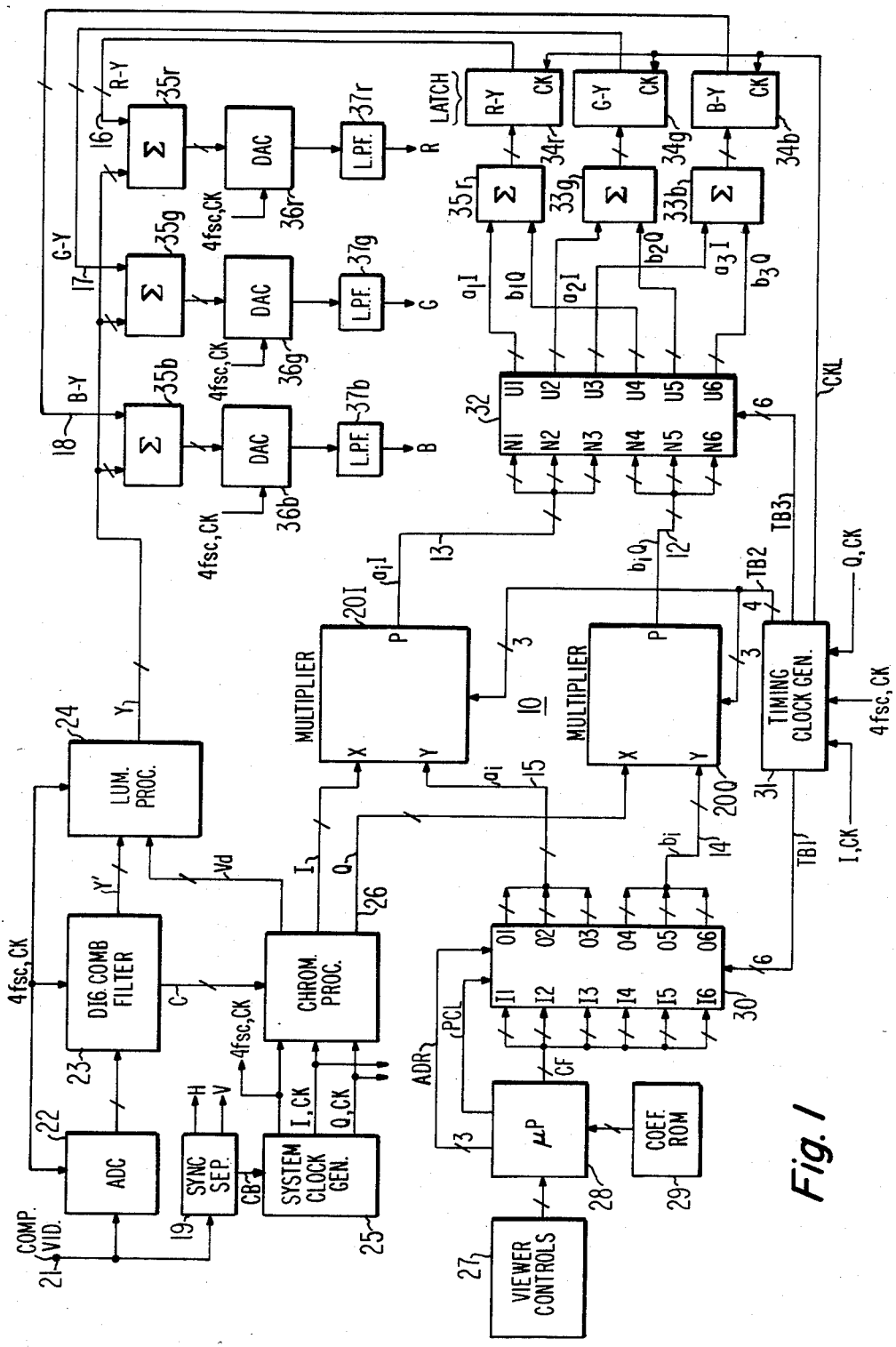
FIG. 1 illustrates a digital signal processing system for a television receiver that includes a digital, variable coefficient matrix embodying the invention.

In the digital signal processing system for a digital television receiver, illustrated in FIG. 1, an analog composite video signal is developed at a terminal 21 by preceding conventional analog circuitry, not illustrated. An analog-to-digital converter, ADC 22, samples the composite video signal to produce binary coded digital samples. A digital comb filter 23 processes the digital composite video samples to develop a binary coded digital luminance signal Y' and a binary coded digital chrominance signal C.

The analog composite video signal at terminal 21 is also applied to a sync separator 19 for developing horizontal and vertical sync pulses along signal lines H and V for horizontal and vertical deflection circuits, not illustrated in the figure. Sync separator 19 also supplies along a signal line CB, a color burst reference signal of frequency $f_{sc}$, the color subcarrier frequency. This signal is supplied to a system clock generator 25 of the digital signal processing system.

System clock generator 25 develops I-clock & Q-clock signals of frequency $f_{sc}$, that are synchronized with the I-axis and Q-axis phase points of the color burst reference signal. System clock generator 25 also generates a $4f_{sc}$ system clock of frequency four times the color subcarrier frequency and synchronized with the I and Q-clocks.

The I and Q-clocks as well as the $4f_{sc}$ system clock are supplied to a chrominance processor 26. Chrominance processor 26 receives the digital chrominance signal C and demodulates it on the I and Q axes of the color burst reference signal to produce binary coded, digital, color mixture I and Q samples. A lowpass filter within chrominance processor 26 developes on a data bus Vd the vertical detail information contained in the chrominance signal C. The vertical detail information and the combed luminance information Y' are received by a luminance processor 24 to develop a processed luminance signal Y.

Binary coded, digital, color difference samples R-Y, G-Y and B-Y are developed along respective data buses 16, 17 and 18 from the I and Q digital samples in a manner hereafter to be described. The R-Y, G-Y and B-Y digital samples are applied as respective inputs to adders 35r, 35g and 35b. The digital luminance samples Y are applied as another input to the adders. Red, green and blue binary coded digital samples are therefore developed at the outputs of adders 35r, 35g and 35b. These samples are applied respectively to digital-to-analog converters 36r, 36g and 36b for conversion into the analog domain. After filtering by lowpass filters 37r, 37g and 37b, analog drive voltages R, G and B are produced to drive the cathodes of a color picture tube, not illustrated.

The R-Y, G-Y and B-Y color difference digital samples are developed from the I and Q color mixture digital samples by a digital matrix 10, embodying the invention. Digital matrix 10 includes a multiplier 20I for multiplying the I digital samples by the coefficients $a_1$, $a_2$ and $a_3$, in sequence, one after the other. These coefficients appear multiplexed on a data bus 15. The products $a_1I$, $a_2I$, $a_3I$ appear, sequentially, at a port P of multiplier 20I and are multiplexed onto a data bus 13.

Digital matrix 10 also includes a multiplier 20Q for multiplying the Q digital samples by the coefficients $b_1$, $b_2$ and $b_3$ that appear sequentially on a data bus 14. The products $b_1Q$, $b_2Q$ and $b_3Q$ appear sequentially at a port P of multiplier 20Q and are multiplexed onto a data bus 12.

The six products $a_iI$, $b_iQ$, representing the color mixture components of the digital color difference signals are read into a digital store 32. The products $a_1I$, $a_2I$ and $a_3I$ are applied in sequence to input ports N1, N2 and N3, respectively, while the products $b_1Q$, $b_2Q$ and $b_3Q$ are applied in sequence to input ports N4, N5 and N6, respectively. The six color mixture component products are read out of digital store 32 at respective output ports U1 through U6.

The products $a_1I$ and $b_1Q$ are applied as inputs to an adder 33r to develop at the adder output the R-Y binary coded color difference digital sample. The R-Y sample is then stored in a latch 34r. The products $a_2I$ and $b_2Q$ are applied as inputs to an adder 33g to develop at the adder output the G-Y sample. The G-Y sample is then stored in a latch 34g. The products $a_3I$ and $b_3Q$ are applied as inputs to an adder 33b to develop at the adder output the sample B-Y. The B-Y sample is then stored in a latch 34b. After the three color difference samples have been stored in their respective latches, a clock-out signal is applied to each latch along a timing line CKL to clock out the color difference samples R-Y, G-Y and B-Y.

In accordance with an aspect of the invention, digital matrix 10 has the capability of multiplying the I and Q digital samples by variably valued coefficients $a_i$ and $b_i$. Such an arrangement permits the incorporation into the digital matrix of various tint and color control functions. The unmodified values of the coefficients $a_i$ and $b_i$ are stored in a read only memory, ROM 29. A microprocessor 28 accesses ROM 29 to obtain the unmodified values of the matrix coefficients. Microprocessor 28 also receives information from various adjustment controls such as viewer adjustable tint, color, brightness and contrast, collectively identified in FIG. 1 as a box 27.

Based upon the information obtained from controls 27, microprocessor 28 modifies the values of the six coefficients $a_i$ and $b_i$ and supplies them to a digital store 30, in serial fashion, along a data bus CF. Each of the six modified coefficients is directed to an appropriate one of the input ports I1 through I6 by means of a three bit address code developed by microprocessor 28 along an address line ADR. The modified coefficients are entered into digital store 30 upon application of a clock-in pulse developed by microprocessor 28 along a timing line PCL.

For each I sample supplied to the X operand input port of multiplier 20I, digital store 30 multiplexes onto coefficient data bus 15 from output port 01, 02 and 03, the modified matrix coefficients $a_1$, $a_2$ and $a_3$ for multiplication by multiplier 20I. Similarly, for each Q sample, digital store 30 multiplexes onto data bus 14 from output port 04, 05 and 06, the modified coefficients $b_1$, $b_2$ and $b_3$ for multiplication by multiplier 20Q.

Figure 3:
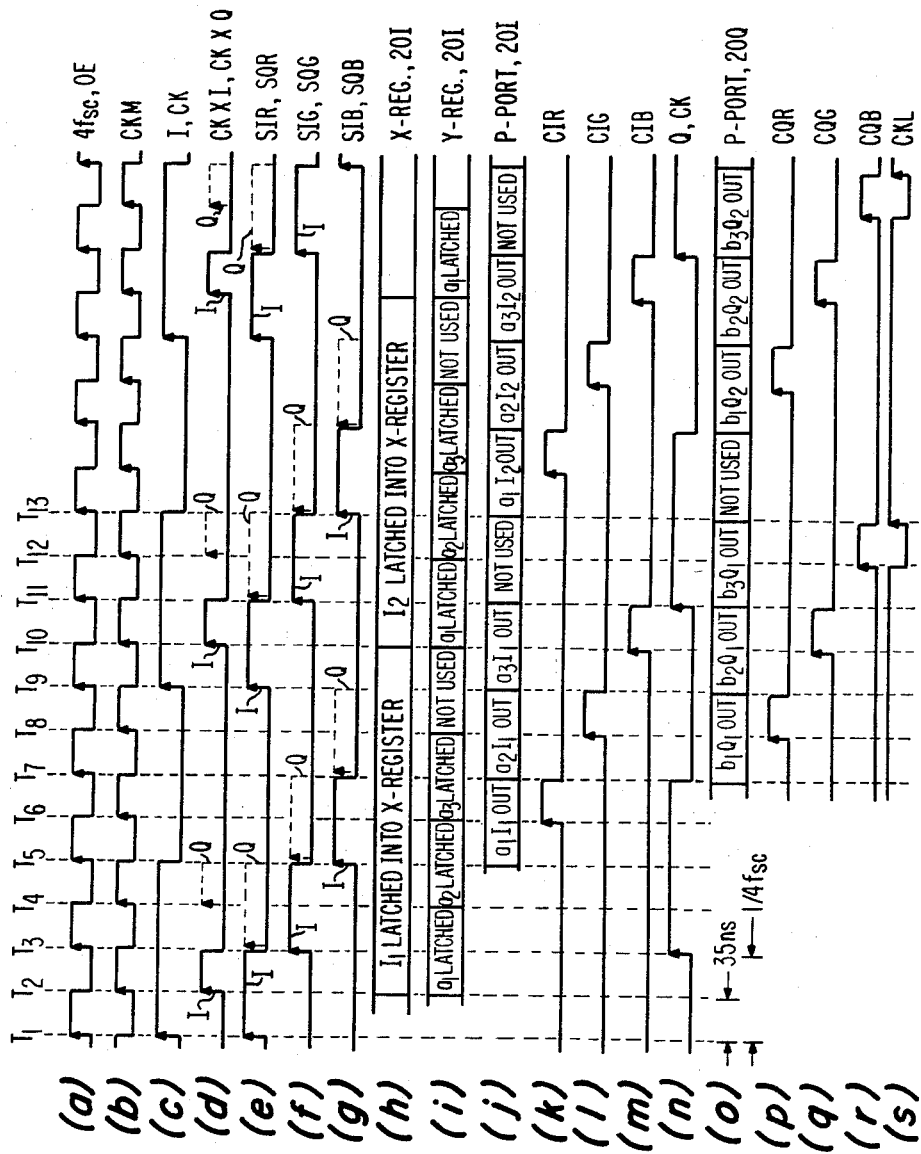
FIG. 3 illustrates a timing diagram useful in explaining the operation of the schematic blocks of FIGS. 1 and 2.

The processing of data through input digital store 30, multipliers 20I and 20Q, output digital store 32 and latches 34r, g, b is controlled by appropriate timing signals developed by a timing clock generator 31 along timing buses TB1, TB2, TB3 and timing line CKL. Timing clock generator 31 receives the $4f_{sc}$ system clock, illustrated in FIG. 3a, the I-clock, illustrated in FIG. 3c and the Q-clock, illustrated in FIG. 3n. From these clocks, timing clock generator 31, using straightforward combinatorial logic, not necessary to be discussed, generates, in a conventional manner, the other timing waveforms of FIG. 3. For simplifying purposes, it is assumed that the leading, or positive-going, edges of each of the waveforms of FIG. 3, indicated by the upwardly pointing arrows, initiate the digital processing steps associated with the respective waveform. Each of the instants $T_1$ through $T_{13}$ of FIG. 3 are equally spaced in time. For a color subcarrier frequency $f_{sc}$ of 3.58 MHz, the half-period of the $4f_{sc}$ system clock of FIG. 3a is an approximately 35 nanosecond interval.

Figure 2:
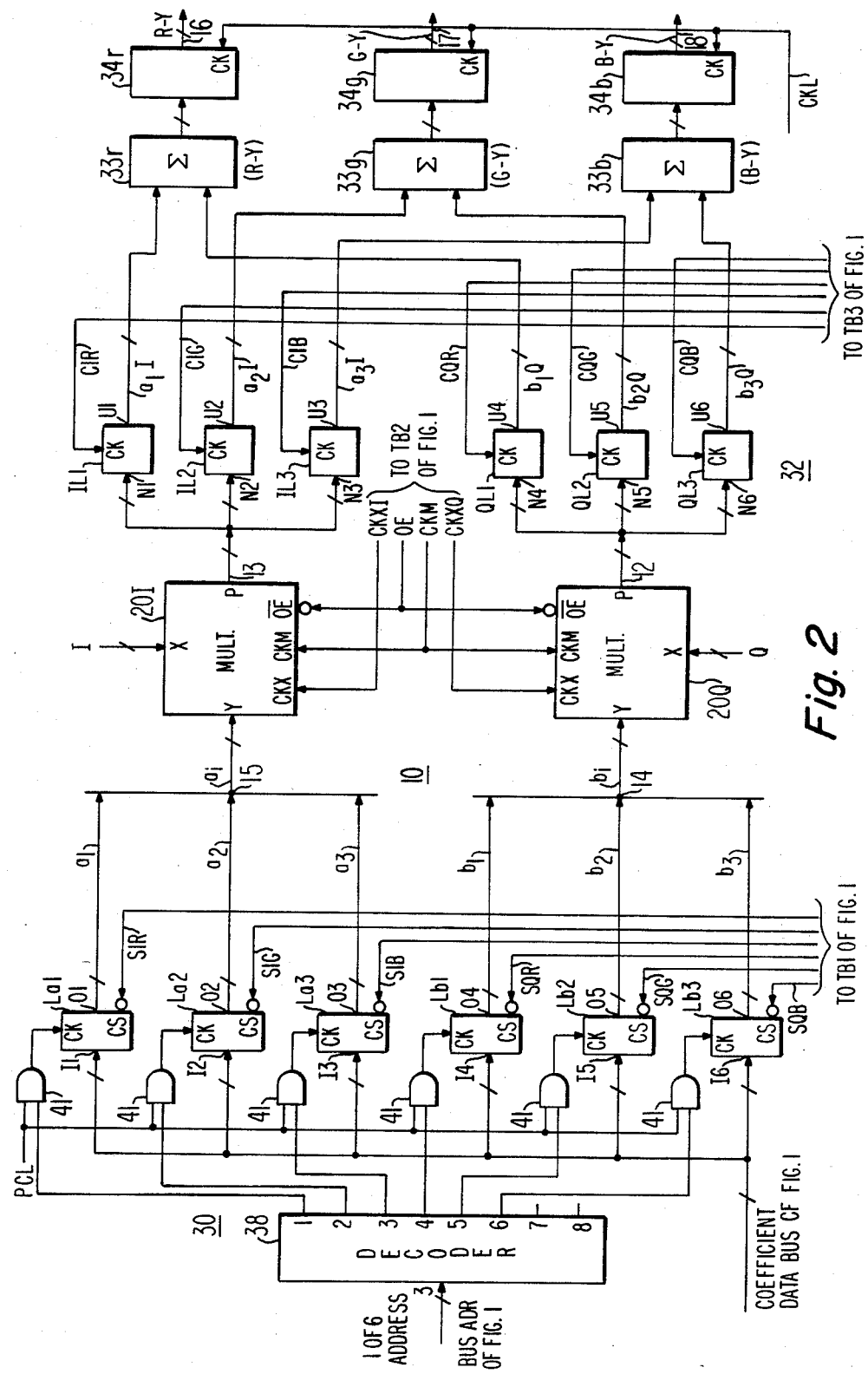
FIG. 2 illustrates a portion of the system of FIG. 1 including specific embodiments of the input digital store that provides modified coefficients to the I and Q multipliers and the output digital store that receives the products therefrom.

FIG. 2 illustrates a detailed embodiment of the digital matrix 10 of FIG. 1, in accordance with the invention, capable of providing variable coefficient matrix multiplication. Items in the two figures identified the same perform similar functions or represent similar quantities.

The matrix coefficients $a_i$ and $b_i$ are not of fixed value but may vary in accordance with the adjustments provided by viewer control 27 of FIG. 1. Multipliers 20I and 20Q of FIG. 2 therefore must be capable of multiplying the I and Q samples by variably valued matrix coefficients $a_i$ and $b_i$ that are supplied by input digital store 30 as Y operand inputs to the multipliers. A multiplier suitable for use as either of the multipliers of FIG. 2 is one that uses adder array multiplication with pipeline operation so that new operands can be clocked into the X and Y registers associated with the X and Y input ports while the preceding product is read out at the P output port. The design of such a multiplier may be similar to the MPY112K, a parallel multiplier designed to operate at a 30 MHz video rate and manufactured by TRW Corporation, La Jolla, Calif.

In the embodiment of digital matrix 10, illustrated in FIG. 2, the matrix coefficient data bus CF from microprocessor 28 of FIG. 1 is coupled to the input ports I1 through I6 of latches La1 through La3 and Lb1 through Lb3 of input digital store 30. Microprocessor 28 enters on data bus CF new values of the modified coefficients $a_i$, $b_i$ as they are generated in response to changing television receiver operation, such as in response to adjustment of a control in viewer controls box 27 of FIG. 1.

To route the new value of a particular coefficient that appears on data bus CF to the appropriate one of the latches La1 through La3 and Lb1 through Lb3, microprocessor 28 generates a three bit binary address code on a 1 of 6 address bus ADR simultaneously with the generation of the new value of the coefficient on data bus CF.

The three bit address code is applied to a conventional 1 of 8 decoder 38, where, only the first six output terminals are used. Decoder 38 decodes the value of the three bit address code and activates the appropriate output terminal, making that terminal go high, for example. Each of the output terminals 1 through 6 of decoder 38 is coupled through an AND gate 41 to the clock input terminal of a respective one of the latches La1 through La3 and Lb1 through Lb3. The gates 41 are enabled by microprocessor 28 upon application of a clock pulse by the microprocessor along signal line PCL. When an output terminal of decoder 38 goes high, the new value of the associated matrix coefficient that is presently on data bus CF is clocked into the appropriate one of the latches La1 through La3 and Lb1 through Lb3.

The output ports 01 through 03 of latches La1 through La3 are coupled to multiplex data bus 15 that is in turn coupled to the Y operand input port of multiplier 20I. The output ports 04 through 06 of latches Lb1 through Lb3 are coupled to multiplex data bus 14 that is in turn coupled to the Y operand input port of multiplier 20Q. The latch output ports of digital store 30 are each designed as a tri-state output that exhibits a high impedance output state when the signal at a chip select terminal CS is high and is switched into the active state when the signal at chip select terminal CS goes low.

Timing lines SIR, SIG and SIB of timing bus TB1 of FIG. 1 are coupled through inverters to the chip select terminals CS of latches La1 through La3, respectively. Timing lines SQR, SQG and SQB of data bus TB1 are coupled through inverters to the chip select terminals CS of latches Lb1 through Lb3. These six timing lines controls the states of the latch chip select terminals.

Each I or Q binary coded digital sample applied to the X operand input port of multiplier 20I or 20Q must be multiplied three times within one cycle of the I or Q-clock to obtain the three I color mixture components and the three Q color mixture components of the R-Y, G-Y and B-Y color difference signals. In accordance with an aspect of the invention, a multiplexing scheme is provided to enable a ladder array multiplier such as multiplier 20I or 20Q to sequentially multiply the I or Q sample by each one of the matrix coefficients $a_i$ or $b_i$ to obtain, sequentially, at the P output port of multiplier 20I the products $a_1I$, $a_2I$ and $a_3I$ and at the P output port of multiplier 20Q the products $b_1Q$, $b_2Q$ and $b_3Q$. The description of the multiplication process will now be provided for processing the I data. A similar description holds true for processing the Q data.

The solid-line waveforms of FIGS. 3e–3g illustrate the timing relationships of the chip select clock signals developed on timing lines SIR, SIG and SIB. The leading edge of clock SIR appears at time $T_1$ coincident with the leading edge of the I-clock of FIG. 3c. The leading edge of clock SIG is phase delayed from the leading edge of clock signal SIR by one-quarter period from the leading edge of the $1/f_{sc}$ I-clock, and appears at time $T_3$. The leading edge of clock SIB is phase delayed by one-half period, and appears at time $T_5$. The relative phase delaying of the leading edges of the chip select signals SIR, SIG and SIB provide the capability for multiplexing the I coefficients $a_1$, $a_2$ and $a_3$ onto multiplex data bus 15.

At time $T_1$ and I-clock signal and the SIR clock go high placing a sample $I_1$ of the I data stream on the X operand input port of multiplier 20I and placing the matrix coefficient $a_1$ on the Y operand input port. To latch the data into the X and Y registers associated with the X and Y input ports, respectively, clock terminals CKX and CKM of multiplier 20I go high, as illustrated in FIGS. 3b and 3d. These terminals go high at time $T_2$ when the clock signals on timing lines CKXI and CKM of timing bus TB2 of FIG. 1 go high. The clock signals CKXI and CKM go high at time $T_2$ delayed from time $T_1$ in order to permit the processing delays to elapse that may occur in supplying the data to the X and Y ports. Thus, at time $T_2$, and $T_1$ sample is latched into the X operand register as indicated by FIG. 3h, and the matrix coefficient $a_1$ is latched into the Y operand register as indicated by FIG. 3i.

The leading edge of clock CKM at time $T_2$ begins the multiplication process of the present values of the X and Y operands and latches into the P-register the product value of the previous multiplication. Multiplication is performed by an array of unclocked gated adders in a pipelined operation, so that after the lapse of a given time, illustratively 100 nanoseconds, the product $a_1I_1$ appears at the product register associated with output port P of multiplier 20I.

The output pins of output port P are designed in a tri-state configuration controlled by the signal state on a control pin $\overline{OE}$. When control pin $\overline{OE}$ is in the high state, the output pins of the P port exhibit a high impedance and when in the low state are in the active state.

As mentioned previously, near time $T_5$ the product $a_1I_1$ has been formed in the output register associated with the P port. Thus to read out the product data from port P onto data bus 13 of FIG. 2, the leading edge of clock signal OE of FIG. 3a goes high. Clock signal OE is inverted and applied to pin $\overline{OE}$. As indicated by FIG. 3j, the product data $a_1I_1$ appears at the P port after time $T_5$.

Data bus 13 is coupled to input ports N1, N2 and N3 of output digital store 32. Output digital store 32 includes latches IL1, IL2 and IL3 having input ports that comprise the ports N1, N2 and N3 and includes latches QL1, QL2 and QL3 having input ports that comprise ports N4, N5 and N6. Ports N4, N5 and N6 are coupled to data bus 12 that receives the product data from the P port of multiplier 20Q.

The output ports of latches IL1 through IL3 and QL1 through QL3 comprise the ports U1 through U6, respectively, of digital store 32. Each of the latches of digital store 32 passes through to its output port the data that is clocked into its input port upon receipt of a read-in clock signal that is applied to a clock terminal CK. The read-in clock signals, CIR, CIG and CIB for latches IL1, IL2 and IL3 are illustrated by the solid line waveforms of FIGS. 3k, 3l and 3m, respectively. As mentioned previously, the product $a_1I_1$ appears at output port P of multiplier 20I beginning near time $T_5$ of FIG. 3j. Taking into account digital processing delay, this product data is read into latch IL1 at time $T_6$ by the leading edge of clock CIR and appears thereafter at output port U1.

The multiplication of the sample $I_1$ by the coefficient $a_2$ in multiplier 20I begins at time $T_4$ at the leading edge of clock signal CKM. Multiplication by the coefficient $a_2$ begins at time $T_4$ even though the previous multiplication of the sample $I_1$ by the coefficient $a_1$ has not been completed and has not been read out of the P port. This type of operation is possible because of the pipelining configuration of multiplier 20I. By time $T_7$, the product $a_2I_1$ has appeared at the P port as indicated in FIG. 3j. This product is read out by the clock signal CIG into the latch IL2 at time $T_8$ as indicated by FIG. 3l.

When the leading edge of the chip select signal SIB is developed at time $T_5$ of FIG. 3g, the third coefficient $a_3$ is clocked out of latch La3 onto multiplex line 15. At the leading edge of clock CKM, at time $T_6$, the coefficient $a_3$ is latched into the Y register of the Y operand port to begin its multiplication with the $I_1$ sample. At time $T_9$, when the output enable signal OE goes high, the product $a_3I_1$ appears at the P port, and at time $T_{10}$ when clock signal CIB is applied to latch IL3 the product $a_3I_1$ is read out of the P port into latch IL3 to shortly thereafter appear at output port U3.

From the foregoing, one notes that by time $T_{10}$, the three I color mixture components $a_1I_1$, $a_2I_1$, $a_3I_1$ of the R-Y, G-Y B-Y color difference signals have been developed at output ports U1, U2 and U3. The clock signals CIR, CIG and CIB occur at short enough intervals from one another to permit pipelining of the multiplication process.

During each cycle of the Q-clock illustrated in FIG. 3n, the $Q_1$ sample is latched into the X register of the Q multiplier 20Q by clock signal CKXQ, illustrated in dashed line waveform in FIG. 3d. The chip select signals SQR, SQG and SQB illustrated by the dashed line waveforms of FIGS. 3a, 3f and 3g, sequentially clock out of latches Lb1, Lb2 and Lb3, the Q coefficients $b_1$, $b_2$ and $b_3$. These coefficients are placed at the Y input port of multiplier 20Q to be sequentially multiplied by the $Q_1$ sample, the multiplications starting at the leading edges of clock CKM at times $T_4$, $T_6$ and $T_8$. The products $b_1Q_1$, $b_2Q_1$ and $b_3Q_1$ appear at the P port of multiplier 20Q beginning at times $T_7$, $T_9$ and $T_{11}$, respectively, as indicated in FIG. 3o. These products are read into respective latches QL1, QL2 and QL3 by the leading edges of clock signals CQR, CQG and CGB, illustrate in FIGS. 3p, 3q and 3r.

From the above discussion, one notes that by time $T_{12}$ the six products corresponding to the six color mixture components of the three color difference signals have been developed at the respective output ports U1 through U6.

Output ports U1 and U4 are coupled to adder 33r. The R-Y digital sample is therefore developed at the outputs of adder 33r once the products $a_1I$ and $b_1Q$ have been developed at ports U1 and U4. Output ports U2 and U5 are coupled to the input ports of adder 33g. The G-Y digital sample is developed at the output of adder 33g once the products $a_2I$ and $b_2Q$ have been developed at ports U2 and U5. Output ports U3 and U6 are coupled to the input ports of adder 33b. The B-Y digital sample is developed at the output of adder 33b once the products $a_3I$ and $b_3Q$ have been developed at ports U3 and U6. Thus, by time $T_{12}$ of FIG. 3 the R-Y, G-Y and B-Y digital samples corresponding to a given pair of I and Q samples appear at the outputs of adders 33r, 33g and 33b, respectively.

The outputs of the three adders are read into the corresponding latches 34r, 34g and 34b by the leading edge of a clock pulse developed on timing line CKL and applied to the clock terminal of the latches. Shortly thereafter, the R-Y, G-Y and B-Y digital samples are developed at the output ports of the respective latches along data buses 16, 17 and 18 of FIG. 1. The clock pulse CKL is illustrated in FIG. 3s and comprises the logical inversion of the clock pulse CQB of FIG. 3r. Thus the leading edge of clock pulse CKL that reads data into latches 34r, 34g and 34b occurs at time $T_{13}$ after the output data of adders 33r, 33g and 33b has become valid.

The R-Y, G-Y, B-Y digital samples appear on data buses 16, 17 and 18 of FIG. 1 at a rate that is 4 times slower than that of the Y digital samples being supplied from luminance processor 24. To avoid introducing unduly visible artifacts into the color picture information it may be desirable to double or quadruple the rate at which the color difference samples are being provided to adders 35r, 35g and 35b. An interpolation scheme to increase the data rate may be used that is similar in approach and in hardware to that described in the aforementioned Lewis patent application, herein incorporated by reference.

The coefficient digital matrix 10 of FIG. 2, embodying the invention, includes multipliers that can accept variably valued coefficients as operand inputs thereby providing viewer adjustable tint and color control and enabling color saturation to track brightness and contrast adjustments. The multiplexing scheme of sequentially multiplying I and Q data samples by their respective coefficients conserves the amount of real estate needed for the multiplier circuitry on an integrated circuit ship. The multiplier configuration chosen should be capable of performing the multiplication operation fast enough so as to perform multiple multiplications within a given I or Q clock cycle. Pipelined adder array multipliers are therefore well suited for use in digital matrix 10 of FIG. 2 wherein the multiplication process is capable of being performed such that a next subsequent multiplication is started before a given multiplication is completed. These multipliers are also relatively conservative in the amount of the integrated circuit chip area used for their fabrication.

What is claimed is:

1. A digital color matrix for a digital television receiver, comprising:
   means for generating samples of binary coded color mixture digital signals that are a representation of color picture information;
   means for generating values of binary coded coefficients that convert the representation of said color picture information from color mixture signals into binary coded color difference signals;
   means for storing said binary coded coefficients;
   a multiplier arrangement receiving samples of said binary coded color mixture digital signals as first inputs for multiplying samples thereof by corresponding binary coded coefficients that are supplied by said storing means as second inputs, wherein the multiplication process is capable of being performed in a pipeline operation such that a next subsequent multiplication is started before a given multiplication is completed;
   means for sequentially clocking out of said storing means selected ones of said binary coded coefficients at short enough intervals to permit pipelining of the multiplication process for developing a plurality of products corresponding to the color mixture components of said binary coded color difference signals; and means responsive to said plurality of products for combining the products to form samples of said binary coded color difference signals.

2. A color matrix according to claim 1 wherein said multiplier arrangement is designed in the form of an adder array.

3. A color matrix according to claim 1 wherein said clocking out means comprises means for generating color mixture clock signals that are in synchronous relationship with the color mixture phase points of the color burst reference signal associated therewith and means for generating a plurality of clock signals phase shifted from said color mixture clock signals to sequentially clock out of said storing means the selected ones of said binary coded coefficients of modified value associated with said plurality of phase shifted clocks.

4. A color matrix according to claim 3 wherein said combining means includes a plurality of output latches and means for sequentially entering therein the products developed by said multiplier arrangement.

5. A color matrix according to claim 4 wherein said combining means further includes a plurality of adders for summing the products stored in said output latches to form said samples of said binary coded color difference signals.

6. A color matrix according to claim 5 wherein said coefficient generating means includes means responsive to an adjustment control for producing said binary coded coefficients with values modified in accordance therewith.

7. A color matrix according to claim 1 wherein said coefficient generating means includes means responsive to an adjustment control for producing said binary coded coefficients with values modified in accordance with the adjustment.

8. A color matrix according to claim 7 wherein said storing means includes a plurality of input latches for receiving said binary coded coefficients of modified value, the outputs thereof being coupled to said multiplier arrangement.

* * * * *